United States Patent [19]

Roy et al.

[11] Patent Number: 5,774,263
[45] Date of Patent: Jun. 30, 1998

[54] STEREOSCOPIC FILM CARTRIDGE FOR A STEREOSCOPIC VIEWER

[75] Inventors: Eddy Roy, Laval; Michel Hamel, St-Pierre-d'Orléans; Claude Gosselin, Sillery; Benoît Laflamme, Québec, all of Canada

[73] Assignee: 9010-7210 Quebec Inc., Montreal, Canada

[21] Appl. No.: 509,742

[22] Filed: Aug. 1, 1995

[51] Int. Cl.[6] .......................... G02B 27/22; G03B 35/00
[52] U.S. Cl. .......................... 359/469; 359/466; 396/324
[58] Field of Search .................... 354/110, 112, 354/114, 116; 359/466, 469, 474, 477; 396/324, 326, 328, 33.6

[56] References Cited

U.S. PATENT DOCUMENTS

| Re. 32,487 | 9/1987 | Kalaugher | 350/140 |
|---|---|---|---|
| 2,093,520 | 9/1937 | Hayashi | 359/469 |
| 2,573,543 | 10/1951 | Childs | 88/31 |
| 2,807,191 | 9/1957 | Flora | 88/31 |
| 2,814,966 | 12/1957 | Crossley | 359/469 |
| 2,889,744 | 4/1959 | Bonanno | 88/31 |
| 3,649,099 | 3/1972 | Furuoka | 359/469 |
| 3,722,983 | 3/1973 | Brassington | 350/135 |
| 4,026,636 | 5/1977 | Cecchini | 350/135 |
| 4,116,533 | 9/1978 | Nerlich | 350/135 |
| 4,142,778 | 3/1979 | Lasky et al. | 350/135 |
| 4,256,367 | 3/1981 | Connors | 359/469 |
| 5,268,713 | 12/1993 | Kataoka | 354/288 |

FOREIGN PATENT DOCUMENTS

| 758353 | 4/1967 | Canada . |
| 1432817 | 4/1966 | France . |
| 1284011 | 4/1972 | United Kingdom . |

*Primary Examiner*—Safet Metjahic
*Assistant Examiner*—Nicholas J. Tuccillo
*Attorney, Agent, or Firm*—Galgano & Burke

[57] ABSTRACT

The stereoscopic film cartridge is for a stereoscopic viewer having binocular eyepieces and a film driving device. It comprises a thermally formed elongated film tending to roll around itself; and a housing for housing the film, the housing being provided with a first opening arranged to permit engagement of the film driving device with the film when the cartridge is mounted onto the stereoscopic viewer. The housing includes two opposite compartments and a guiding channel extending between the inlets of the compartments, for guiding the film between the inlets. The channel has a front panel provided with right and left adjacent viewing windows, the front panel having an inner surface provided with a first pair of upper and lower parallel projecting bands; and a rear panel comprising translucent means, the rear panel having an inner surface provided with a second pair of upper and lower parallel projecting bands facing respectively the first pair of bands.

15 Claims, 7 Drawing Sheets

STEREOSCOPIC FILM CARTRIDGE FOR A STEREOSCOPIC VIEWER

FIELD OF THE INVENTION

The present invention is concerned with a stereoscopic film cartridge for a stereoscopic viewer having binocular eyepieces and a file driving device.

BACKGROUND OF THE INVENTION

There are numerous viewers using a gearing system for driving a 35 mm film of stereoscopic images. The movement of the gearing is often driven by a cumbersome and complex manual mechanism, actuated by either a push button, a cog-wheel or a spring.

Known in the art, there is the U.S. Pat. No. 4,256,367 of Robert G. Connors, granted on Mar. 17, 1981 in which there is described a stereoscopic viewer and booklet device for presenting information in two complementing media. The viewer utilizes a split 35 mm film having pairs of stereoscopic spaced frames. Sprocket holes are provided at regular intervals along the film The viewer includes a film guide channel having a film take-up archway, adapted to accommodate the film spacing between paired frames to thereby effect alignment of the paired frames with respective lenses of the stereoscope. A centrally disposed thumbwheel is manually actuated to rotate a sprocket wheel for advancing and rewinding the film laterally through the stereoscopic viewer. The sprocket wheel cooperates with the film take-up archway to provide multiple sprocket teeth engagement with the sprocket holes. One drawback with this apparatus is that when the film is moving within the film guide channel, it rubs its surfaces on the inner surface of the film storage cavities so that, after a certain time, the quality of the images on the film is deteriorated.

Also known in the art, there is the U.S. Pat. No. 2,573,543 of John C. Childs, granted on Oct. 30, 1951, and which describes a device consisting essentially of a rectangular casing, open at the rear, and having a cover fitted thereon. A stereoscopic viewer is held within the casing. The viewer consists of two hollow members, each defining a passage. Lenses are inserted in the front end of each passage in alignment with openings. The rear thereof is open. Within a chamber is a cylindrical spring member into which film, fed from a spool at the right of the casing, is adapted to be coiled. Film re-winder fits on the chamber. The first drawback with its apparatus is that it uses at least one spool for storing the film. A second drawback is that, as the film is moving in and out of the chamber, it rubs its surfaces on the inner surface of the chamber so that, after a certain time, the quality of the images is deteriorated.

Also, known in the art, there are the following U.S. Pat. Nos. 3,722,983; 2,807,191; 4,026,636; 4,142,778; Re 32,487; 4,398,723; 4,116,533; 3,649,099; 2,889,744; 2,814,966; Canadian patent No. 758,353; British patent Nos. 1,284,011 and 1,105,833; and French patent No. 1.432.817.

None of the above patents provides a stereoscopic film apparatus which, on one hand, allows the film to move freely within guiding channel and cavities without the use of spools and, on the other hand, prevents deterioration of the images due to the friction of the film against inner surfaces of storing cavities.

An object of the present invention is to provide a stereoscopic film cartridge for a stereoscopic viewer, which prevents a rapid deterioration of the film images.

SUMMARY OF THE INVENTION

According to the present invention, there is provided stereoscopic film cartridge for a stereoscopic viewer having binocular eyepieces and a film driving device, comprising:

a thermally formed elongated film tending to roll around itself; and a housing for housing the film, the housing being provided with a first opening arranged to permit engagement of the film driving device with the film when the cartridge is mounted onto the stereoscopic viewer having, the housing including:

two opposite compartments having inlets for receiving ends of the film, each of the compartments having an inner surface provided with upper and lower parallel projecting bands onto which, in operation, lateral edge surfaces of the film slide; and a guiding channel extending between the inlets of the compartments, for guiding the film between the inlets, the channel having:

a front panel provided with right and left adjacent viewing windows arranged to get in alignment with the binocular eyepieces when the cartridge is mounted onto the stereoscopic viewer, the front panel having an inner surface provided with a first pair of upper and lower parallel projecting bands; and a rear panel comprising translucent means for permitting light to enter into the channel and illuminate the film at each one of the viewing windows, the rear panel having an inner surface provided with a second pair of upper and lower parallel projecting bands facing respectively the first pair of bands.

The more detailed aspects of the different components of the invention will be described below by making reference to the appended drawings.

DETAILED DESCRIPTION OF THE DRAWINGS

In the following description, the same reference numbers are referring to similar elements throughout the drawings.

Stereoscopic image viewers using 35 mm film inserted in a cartridge are already known in prior art. Some of those cartridges are provided at their ends with two empty compartments where the film roll winds and unwinds. The film is driven by a gearing system and is simply guided by the walls of said compartments.

Tests were performed on this type of winding. During these tests, it was noticed that the film was rubbing along the cylindrical walls of the compartments and that it was not easily rolling on itself. Therefore, it appears that the film was rapidly deteriorated with the presence of scrapes and scratches thereon. Also, an important resistance of the film to the motorized driving force was noticed.

To overcome those negative effects, a process was developed for thermoforming the film. The thermoformed film tends to roll on itself and thus forms a cylinder having a total diameter smaller than the one of the compartments. The thermoforming process consists in thermoforming the film so that a roll of film, preferably having a ¾" diameter, is formed. The thermoforming process forces the film to easily roll on itself while leaving sufficient space for its normal expansion. The film will then present a reduced resistance to the film driving system housed in the body of the viewer.

Preferably, the film is rolled around an axle of 5/16 of an inch. Then, a first thermoforming of the rolled film is performed at a constant temperature of 200° F. for twenty minutes. After that, the film is unwounded and rolled again in a reverse manner on the same axle, then a second thermoforming of the film is performed for a time period of twenty minutes at a temperature of 200° F. Then, the film is unwound from the axle and a third thermoforming is performed for a time period of ten minutes while no particular shape is forced on the film.

Referring now to FIGS. 1 to 4 and to figure B, there is shown a stereoscopic film cartridge 1 for a stereoscopic viewer 3 having binocular eyepieces and a film driving device. The cartridge 1 comprises a thermally formed elongated film 2 tending to roll around itself, and a housing for housing the film 2.

The film 2 is a 35 mm film 2 supporting pairs of right and left rectangular stereoscopic images 34 and 36. Opaque sections 38 separate the images 34 and 36. The film 2 is provided with an upper row 40 of perforations extending along the film. The perforations are adapted to cooperate with the film driving device 72 (partially shown in FIG. 4). The film 2 is also provided with a lower row of perforations.

The film 2 is also provided along its length with a translucent band 86 adjacent to its lower edge. The translucent band 86 is regularly provided with opaque marks 88, each corresponding to one of the pair of images 34 and 36. The opaque markers 88 are necessary for positioning the pairs of images 34 and 36, as it will be more fully described further in the description. Preferably four perforations are provided between each pair of stereoscopic images 34 and 36. The opaque sections 38 separating adjacent images are produced by a high contrast exposure of the film.

The housing of the cartridge 1 includes two opposite compartments 6 having inlets for receiving ends of the film 2. Each of the compartments 6 has a curved inner surface. A guiding channel extends between the inlets of the compartments 6 for guiding the film 2 between the inlets.

To insert the film 2 into the cartridge 1, it is partially unwounded and then inserted into the first integral moulded body 20 in such a manner that a pair of stereoscopic images 34 and 36 is placed in front of the viewing windows 10 and 12. The rolled ends of the film 2 are respectively placed in the two compartments 6.

The channel has a front panel a provided with right and left adjacent viewing windows 10 and 12 arranged to get in alignment with the binocular eyepieces when the cartridge 1 is mounted onto the stereoscopic viewer 3. The channel has also a rear panel 16 comprising translucent means for permitting light to enter into the channel and illuminate the film 2 at each one of the viewing windows 10 and 12.

Preferably, the rear panel 16 is a longitudinally curved panel 16 made of a translucent material providing the translucent means.

Figure 1:
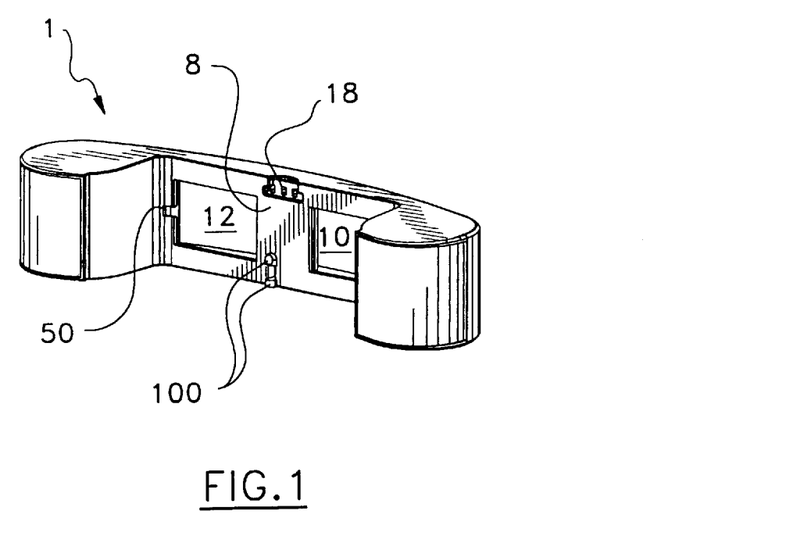
FIG. 1 is a perspective front view of a stereoscopic film cartridge in accordance with the present invention.
Figure 2:
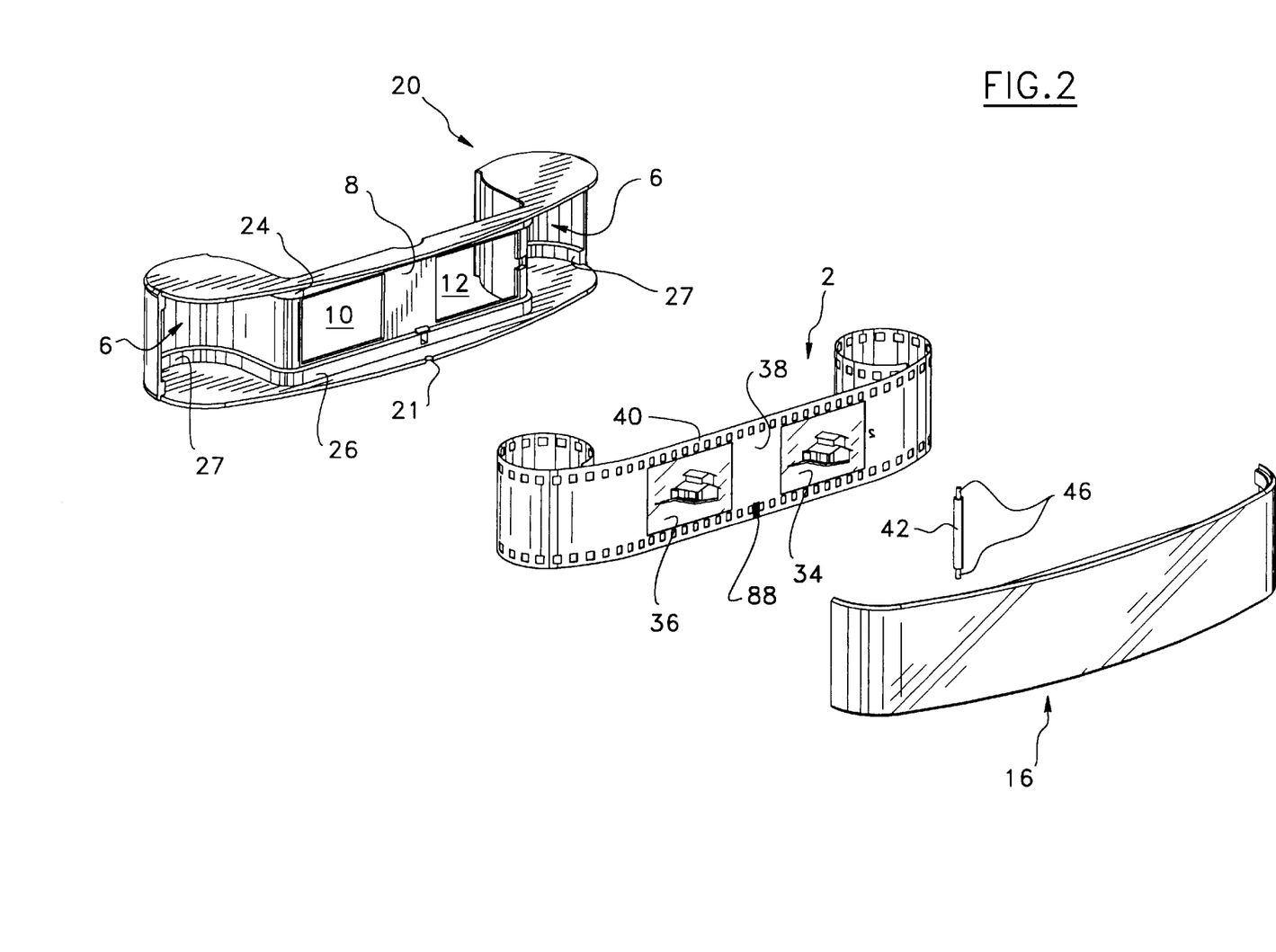
FIG. 2 is an exploded rear view of the cartridge of FIG. 1.
Figure 3:
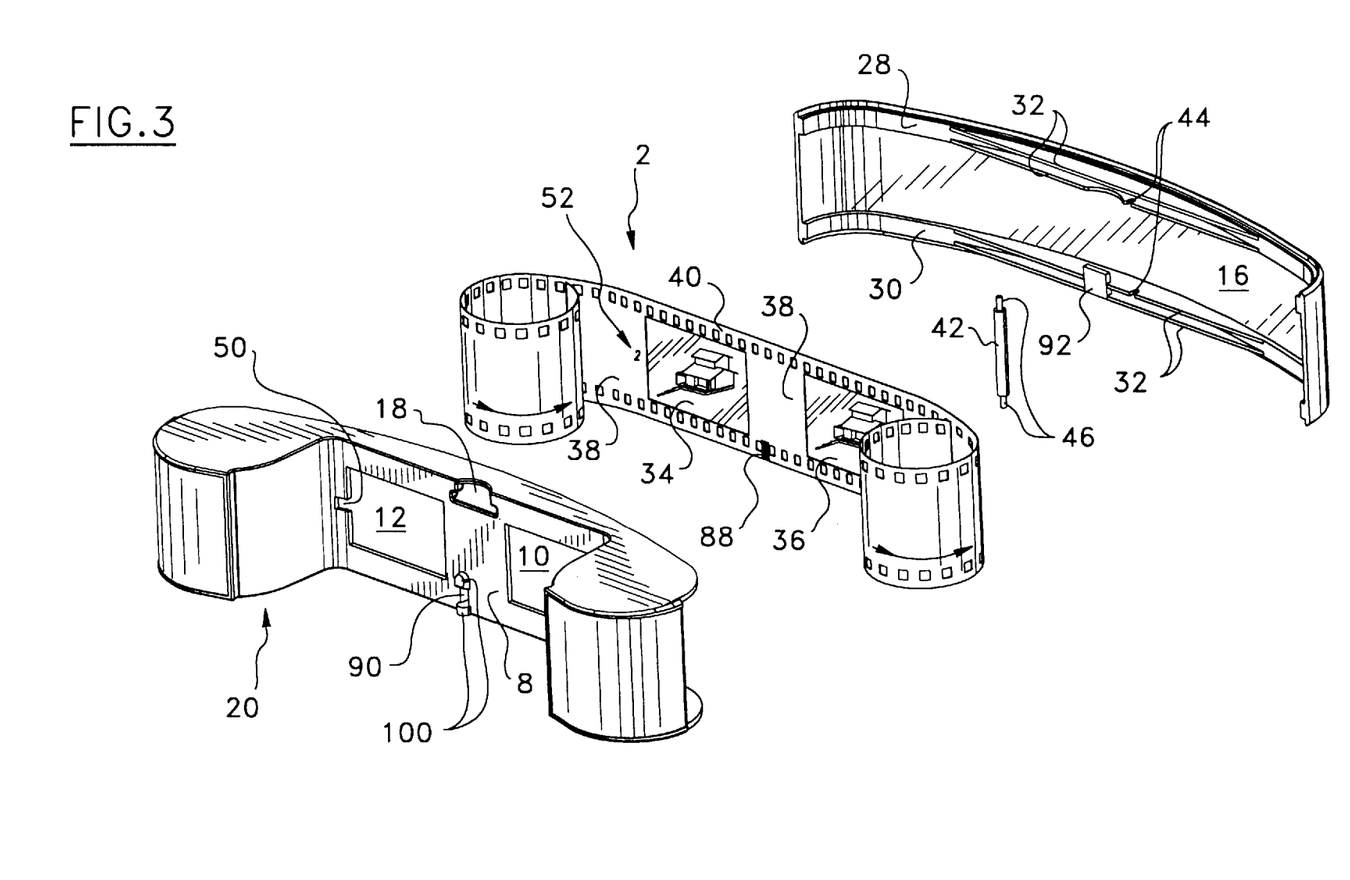
FIG. 3 is an exploded front view of the cartridge of FIG. 1.

In fact, as illustrated more specifically in FIGS. 1, 2 and 3, the rear panel 16 forms a translucent light diffuser slightly rounded to pick up the most of the surrounding light. The two compartments 6 are connected by surrounding light. The panel 16 has an outer surface without any rough patches.

The housing is provided with all opening 18 arranged to permit engagement of the film driving device with the film 2 when the cartridge 1 is mounted onto the stereoscopic viewer 3. The opening 18 is located in a central superior portion of the front panel 8 so that it faces the row 40 of perforations of the film 2.

The two opposite compartments 6 and the front panel 8 are formed by a first integral moulded body 20 made of opaque plastic material. The rear panel 16 is formed by a second integral moulded body 16 made of translucent plastic material. The inner portion of the moulded body 20 is provided with a notch 21 cooperating with a tooth (not shown) in the inner portion of the panel 16 for facilitating the assembly of the body 20 with the panel 16.

It can be appreciated that the use of a thermoformed 35 mm film facilitates the viewing of stereoscopic images by eliminating the handling of slides one by one by the user. The images are full sized, 24 mm×36 mm, images. The film can be unwound continuously from left to right and vice versa, which renders the viewing of the film images more enjoyable and facilitates image searching.

The guiding channel also comprises a first pair of upper and lower parallel projecting bands 24 and 26 located on an inner surface of the front panel 8, and a second pair of upper and lower parallel projecting bands 28 and 30 facing respectively the first pair of bands 24 and 26. The second pair of bands 28 and 30 is located on an inner surface of the rear panel 16. Each of the compartments 6 has an inner surface provided with upper and lower parallel projecting bands 27 onto which, in operation, lateral edge surfaces of the film slide. In FIG. 2, only the lower band 27 is shown but it should be understand that there is an upper band similar to the lower band, extending the upper band 24 of the front panel 8.

To prevent a rubbing of the film images on the inner surface of the compartment 6, the upper and lower parallel projecting bands 27 are provided so that only the portions of the film which are provided with perforations are in contact with the inner surface of the compartments 6 and not the film images.

The first pair of bands 24 and 26 comprises a first substantially straight section. The second pair of bands 28 and 30 is provided with inwardly projecting parallel edges 32 which compensate for the diffuser curve for forming a second substantially straight section facing the first straight section. These edges 32 are for guiding the film 2 along a straight path in front of the viewing windows 10 and 12 and for maintaining a constant focal distance between viewing lenses of the viewer 3 and the stereoscopic pair of images 34 and 36 that are actually viewed.

The front panel 8 is provided with a second opening 90 adjacent to its lower edge and facing a rear central lower opening 84 of the housing of the viewer 3 when the cartridge 1 is mounted into the viewer 3. The rear panel 16 has its inner surface provided with a reflector 92 facing the second opening 90.

A rolling pin 42 made of stainless steel is located in the guiding channel, transversely to movement direction of the film 2, for applying a uniform pressure to the film 2 as it is passing by. Two of the parallel edges 32 of the upper and lower bands 28 and 30 are provided with opposite notches 44 for receiving ends 46 of the rolling pin 42 to maintain it in an operative position in the guiding channel. The pin 42 is made of perfectly smooth stainless steel. The pin 42 prevents the film from bulging, without scratching it. When one of the opaque markers passes in front of the opening 90, the pin 42 keeps it align with the opening so.

Figure 8:
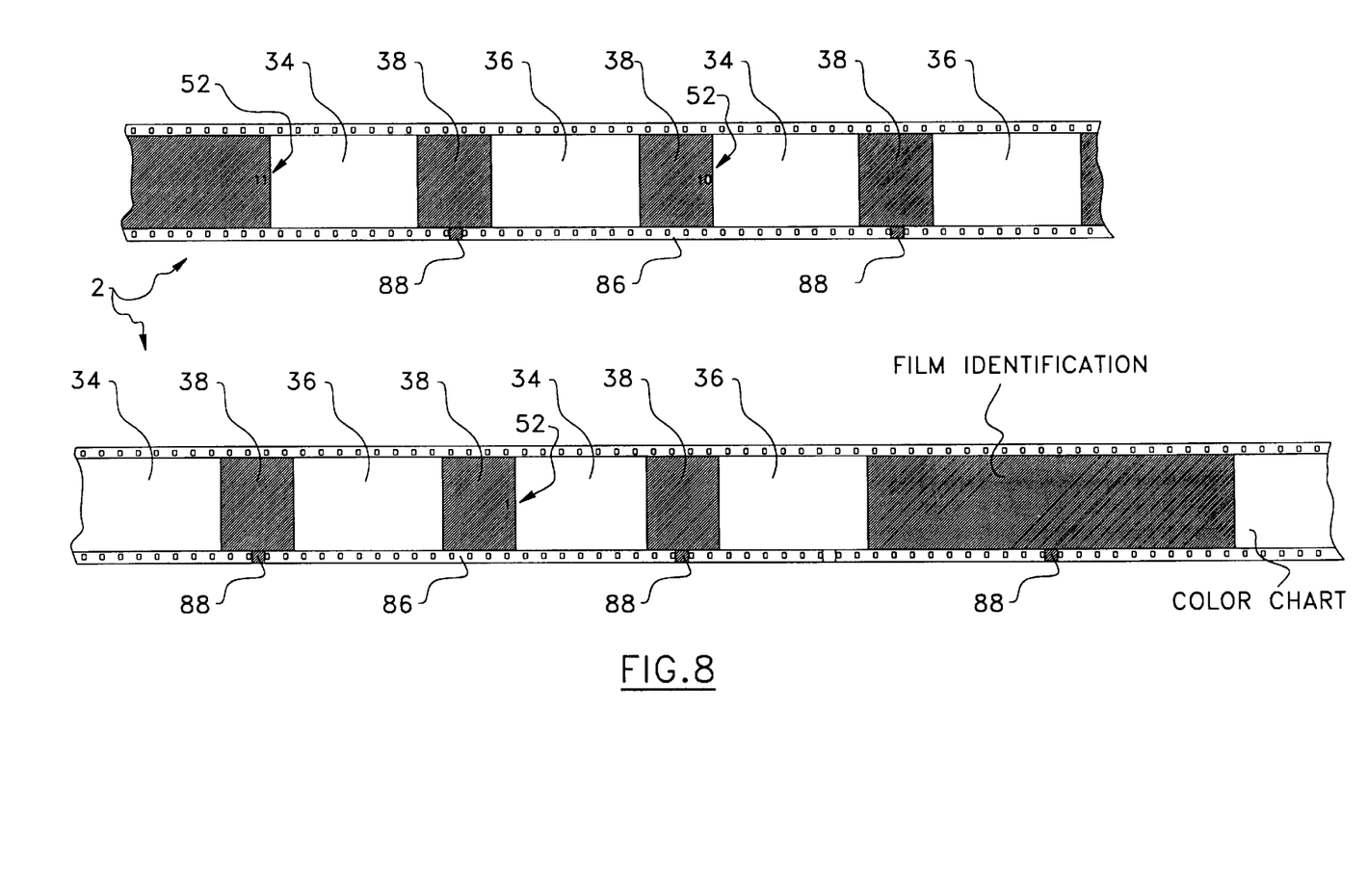
FIG. 8 is a partial front view of a film according to the present invention.

The left viewing window 12 has a left side provided, at a given level, with a notch 50. As illustrated in FIG. 8, the opaque sections 38 adjacent to each left image 34 of the pairs of images 34 and 36 are provided with translucent reference numbers 52 located at said level for allowing an identification of the pair of images 34 and 36 actually viewed by the user. The reference number 52 of each pair of images is printed in the corresponding opaque section.

The housing of the cartridge 1 is provided with positioning teeth 100 cooperating with the rear central lower opening 84 of the housing of the viewer 3 for correctly positioning the cartridge 1 with respect to the viewer 3. The positioning teeth 100 of the cartridge 1 prevent unwanted movements thereof with respect to the viewer 3. Such movements would impede an adequate operation of the diode and the phototransistor with the reflector 92.

The compact and preferably sealed cartridge 1 according to the present invention which is free of any driving mechanism and which encloses a thermoformed film 2 provides many advantages for the user. More particularly, the stereoscopic cartridge according to the present invention is easy to handle, protects the file images and allows an easy identification of the viewed images.

Referring now to FIGS. 4 to 9, there is shown a viewer 3 according to the present invention. The viewer 3 comprises a housing defining two black chambers 60. Each of the black chambers 60 is provided with front and rear apertures 62 and 64. The rear apertures 64 are respectively facing the viewing windows 10 and 12 when the cartridge 1 is mounted into the viewer 3.

The viewer 3 also comprises binocular eyepieces 14 and a film driving device 73. The binocular eyepieces 14 are respectively mounted in the pair of front apertures 62 by means of support elements 66 and 68.

The film driving device 73 comprises a driving member 72 for engaging the film 2 through the opening 18 of the cartridge 1 when the latter is mounted into the viewer 3. A motor 74 drives the driving member 72. A controller 76 controls the motor 74. Control buttons 77 and 78 actuate the motor 74 via the controller 76. An optical indicating device is provided for indicating to the controller 76 when one of the pairs of images is aligned in front of the binocular eyepieces 14. Two batteries 79 are provided for electrically supplying the film driving device.

The housing of the viewer 3 substantially encloses the film driving device 73. This housing is provided with two upper openings 80 allowing access to the control buttons 77 and 76. A rear central superior opening 82 through which the driving member 72 is projecting is provided in the housing of the viewer 3. A rear central lower opening 84 through which the optical indicating device operates is provided in the housing of the viewer 3. The film driving device 73 is located in the central portion of the viewer 3, between the two viewing eyepieces 14. This arrangement reduces considerably the volume of the viewer 3.

On the external surface of the two compartments 6, legend stickers can be placed. They indicate the list of the reference numbers 52 appearing on the film 2.

Figure 4:
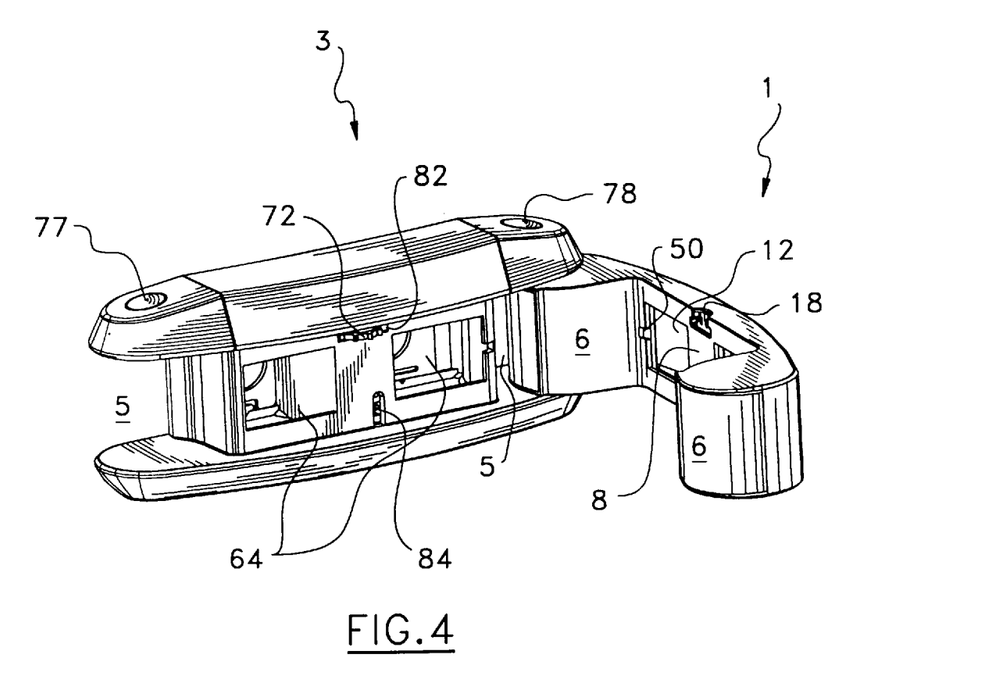
FIG. 4 is a perspective view of the cartridge of FIG. 1 cooperating with a stereoscopic viewer in accordance with the present invention.

Referring now to FIG. 4, there is shown how the cartridge 1 is mounted in the viewer 3. By a simple finger pressure, the two compartments 6 of the cartridge 1 are housed in the two corresponding receiving sections 5 of the viewer 3.

The driving member 72 comes out of the opening 82. When the cartridge 1 is mounted in the viewer 3, the driving member 72 engages with the perforations of the film through the opening 18 for winding or unwinding the film.

The present invention provides a stereoscopic viewer 3 along with a sealed cartridge 1. Several interchangeable cartridges 1 can operate with a viewer 3. In a cartridge 1, a 35 mm film 2 as shown in FIG. 8 is freely mounted. Preferably, ten pairs of stereoscopic images 34 and 36 are provided on each film 2. The film 2 is driven by a gearing system and its unwinding is facilitated by its thermal forming process.

The optical indicating device comprises a light emitting diode 96 connected to the controller 76, and a phototransistor 94 connected to the controller 76 via an amplifier 98. The light emitting diode 96 and the phototransistor 94 are located nearby the rear central lower opening 84 of the housing of the viewer 3. In operation, a light beam is emitted from the light emitting diode 96 through the translucent band 86 of the film 2 and is reflected back by the reflector 92 toward the phototransistor 94. The film 2 is moving until the light beam is blocked by one of the opaque marks 88, which indicates to the controller 76 that one pair of images 34 and 36 is correctly positioned in front of the viewing windows 10 and 12.

Figures 6, 7:
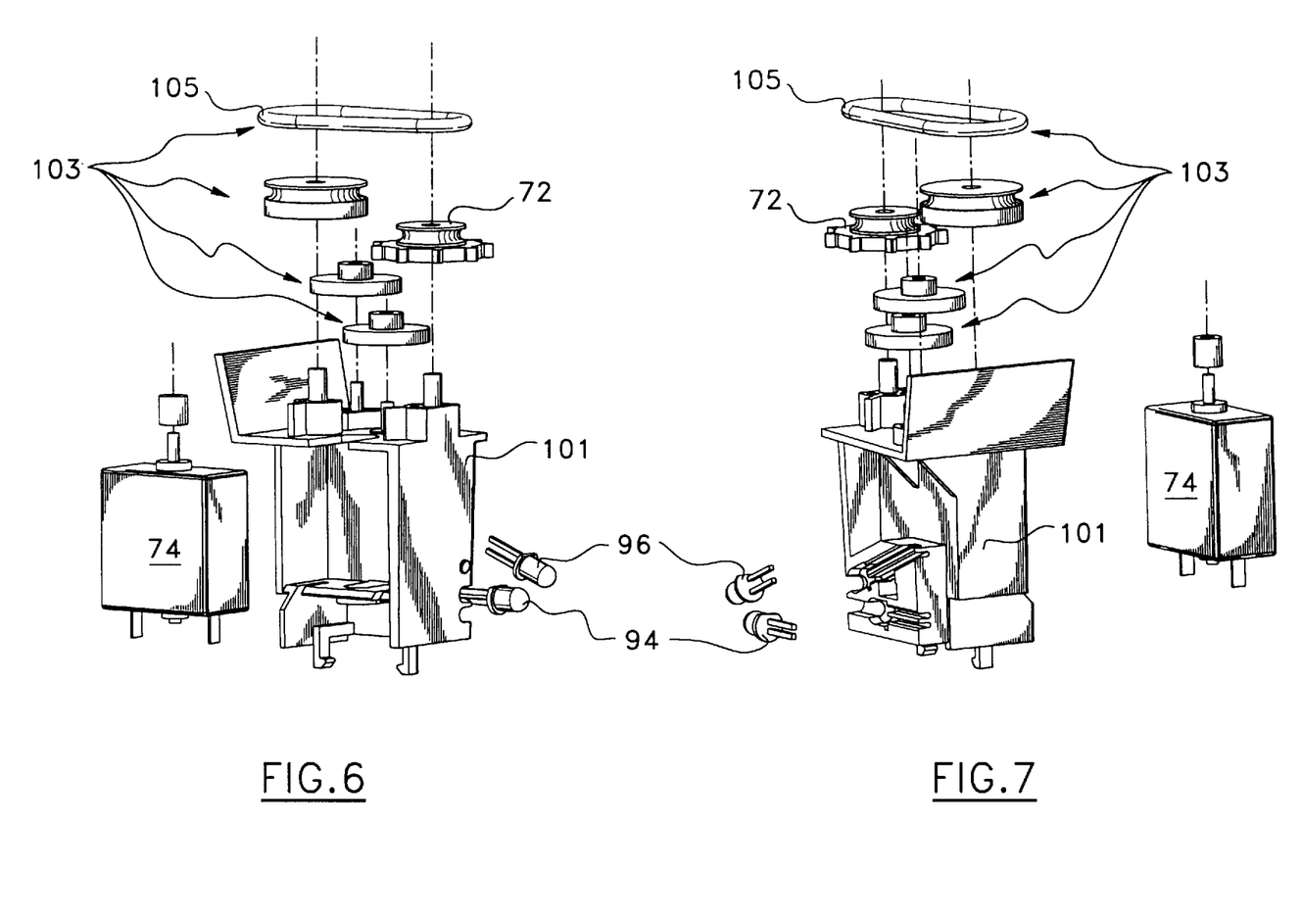
FIG. 6 is a front exploded perspective view of a component of the viewer shown in FIGS. 4 and 5.
FIG. 7 is a back exploded perspective view of the components shown in FIG. 6.

The motor 74 is supplied by two AA batteries 79 and drives a simple set of five gearing elements 103 that gear down the speed and drive the film 2. Two of the five gearing elements 103 are surmounted by pulleys connected to each other by a belt 105 which acts as a clutch in case of film locking, as shown in FIGS. 6 and 7. The film 2 is driven by the sprockets of the driving member 72 which cooperate with the perforations of the upper row of the film 2 via the opening 18. The film 2 is driven in a back and forth movement by simple pressure of the two control buttons 77 and 78.

For motorizing the viewer 3, simplifying its driving system and making it intelligent by allowing each pair of images to be alternatively positioned in alignment with the viewing windows 10 and 12, electronics are provided. The electronics comprise several elements which will be described thereinafter.

The two control buttons 77 and 78 are located on top of the viewer 3, and connected to a printed circuit board 75 which will be referred to as PC board. The light emitting diode 96 emits a light beam and the phototransistor 94 receives a reflected light beam.

The PC board 75 comprises the controller 76 which controls the motor 74, the diode 96 and the phototransistor 94. Several opaque optical markers 88 are printed on the film 2.

When one of the control buttons 77 or 78 is pressed, the motor 74 is activated. A light beam is emitted by the light emitting diode 96, it goes through the film 2 along its lower edge and is reflected by a reflector 92 housed on the inner surface of the panel 16. The reflected beam is picked up by the phototransistor 94.

When one of the opaque markers 88 of the film passes in front of the light beam, the absence of a reflected light beam is detected by the phototransistor 94, which stops the motor by means of the controller 76.

At the centre of the two lower parallel edges 32 there is located the reflector 92 which is mounted according to a given angle to receive the light beam emitted by the diode 96 and to reflect it back toward the phototransistor 94 through the opening 90.

Because of the above described film driving means, electronics and thermoformed film, it is possible to obtain a cartridge 1 and viewer 3 combination that is compact, ergonomic and aesthetic. Also, the cartridge is simple to use with the viewer.

As described hereinbefore, on the inner surface of the panel 16, there are the lower and upper projecting bands 28 and 30, which prevent the rubbing of the film images on the inner surface of the panel 16. The bands 28 and 30 are provided with inwardly projecting parallel edges 32 which compensate for the diffuser curve.

The focal distance between the lenses 14 and the film 2 is relatively short. Therefore, it is necessary to use therefore spherical lenses designed to correct image distortion, particularly in its peripheral area. Thus high quality three-dimensional images are obtained with a resulting panoramic effect never attained before. Each of the lenses 14 is respectively inserted in a support 68 which moves from left to right and from right to left for compensating for individual pupillary spacing differences.

Figure 5:
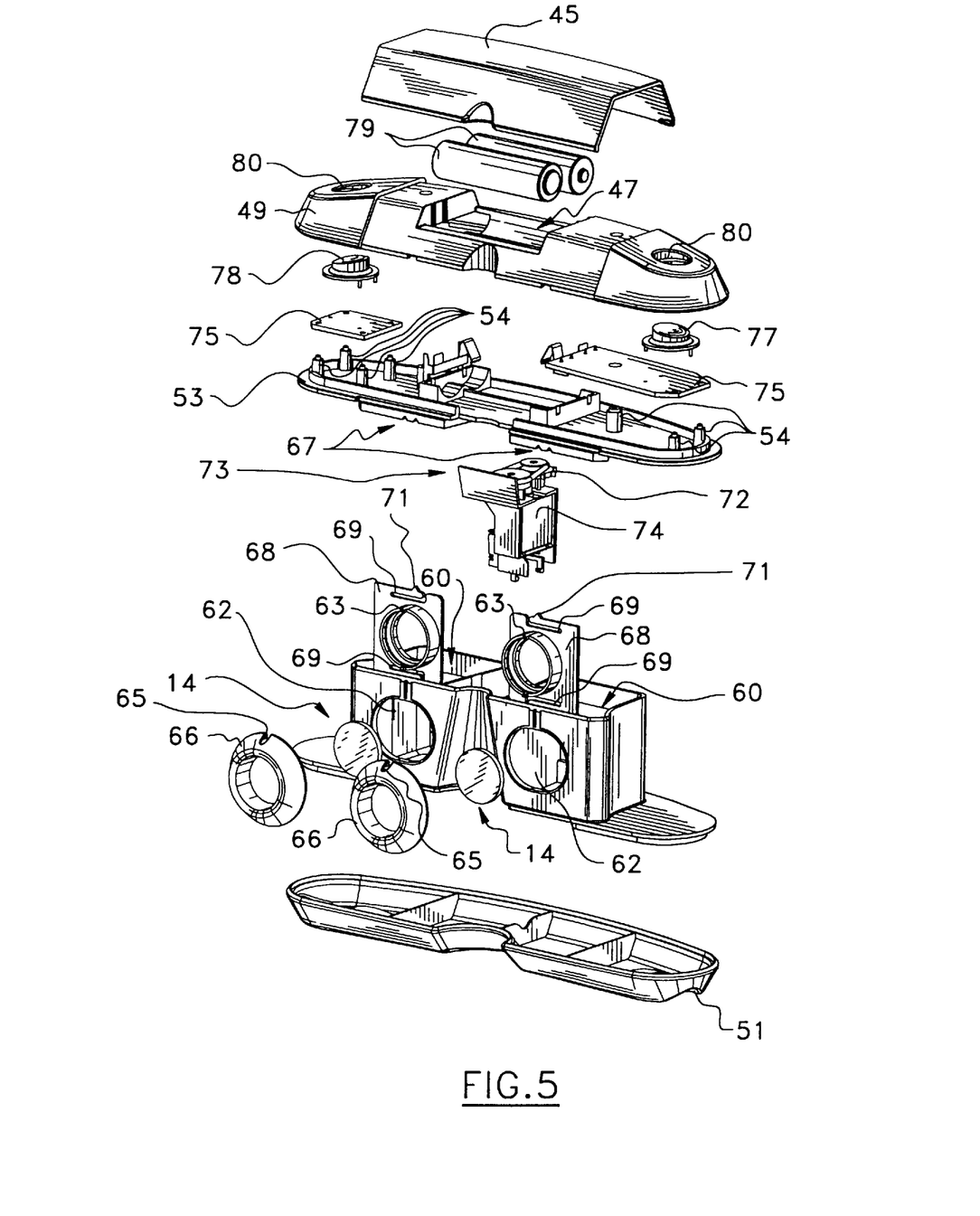
FIG. 5 is a front perspective exploded view of the viewer shown in FIG. 4.

Referring now to FIG. 5, each of the two dark chambers 60 has in its front central portion, a circular apertures 62 where an adjustable support 68 of the binocular eyepieces is inserted. Each support 68 is shaped as a plate and moves laterally by sliding on two integrated spring sliding channels 69 made of flexible material. Each of the supports 68 is provided with a tooth 71 on its top edge, and with a tooth (not shown) on its bottom edge. The teeth of each support 68 respectively engage a top notch 67 and a bottom notch (not shown). The eyepieces 14 are forced into the supports 68 and are maintained in position by means of protuberant caps 66. Each of the caps 66 is fitted on the corresponding adjustable support 68 by means of a small notch 65 cooperating with a tooth located on the top central portion of the corresponding aperture 62.

The housing of the viewer 3 comprises a bottom body 51 and a top body 49. It also comprises a support body 53 for supporting the PC boards 75 by means of pillars 54 having ends engaging into holes located in the PC board. The top body 49 is provided with a compartment 47 for containing two AA batteries 79. This compartment 47 is provided with electrical contacts. A cover 45 closes the compartment 47.

The control buttons 77 and 78 respectively controls the unwinding of the film from left to right and from right to left. The top body 49 is provided with two circular openings 80 through which the user has an access to the control buttons 77 and 78.

Referring now to FIGS. 6 and 7, the motor block 73 comprises the motor 74 with its support 101, a transmission, the light emitting diode 96, and the phototransistor 94. The transmission mechanism comprises gearing 103 and a driving belt 105.

Figure 9:
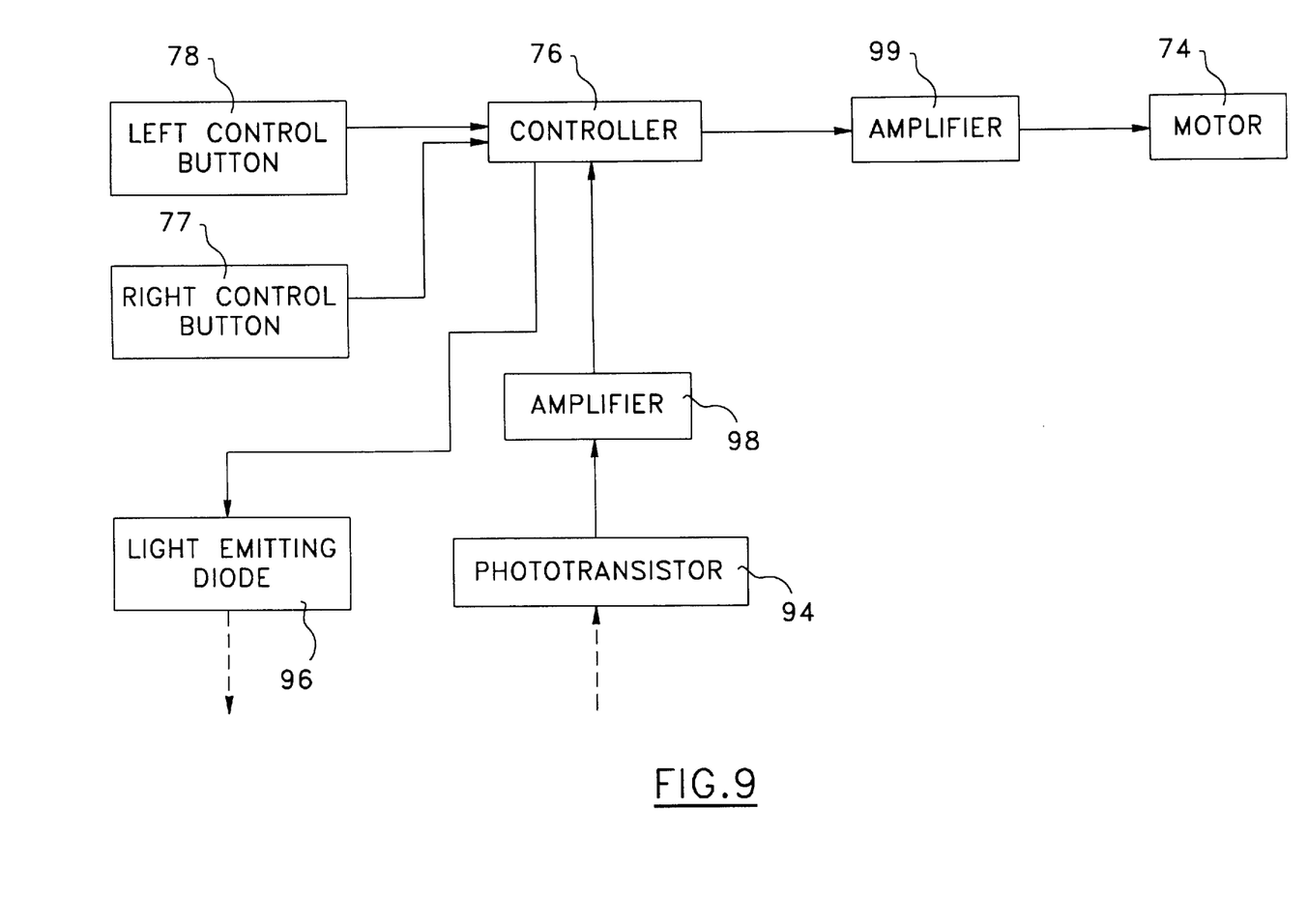
FIG. 9 is a block diagram of parts of the viewer shown in FIGS. 4 and 5.

Referring now to FIG. 9, when the right or left control button 77 or 78 is pressed, a signal is sent to the controller 76. Upon reception of the signal, the controller 76 activates the light emitting diode 96 and starts the motor 74. The light beam emitted by the light emitting diode 96 goes through the film and is reflected by the reflector located on the inner surface of the cartridge. Then, the reflected light beam is picked up by the phototransistor 94. The output signal of the phototransistor 94 is amplified by the amplifier 98 and sent to the controller 76.

When one of the opaque makers 88 of the film 2 passes in front of the light beam, the phototransistor 94 does not detects the reflected light beam. Then the controller 76 stops the motor 74, and restarts it in the opposite direction, at a reduced speed, until an opaque marker intercept the light beam. The restarting of the motor 74 is necessary because the motor inertia prevents the film to stop at the right position on the first detection of the opaque marker 88.

On the second detection of the opaque marker 88, the motor 74 stops. The controller 76 verifies the output signal of the amplifier 98 to see whether a marker 88 is adequately located in front of the light beam between the diode 96 and the phototransistor 94. If no marker is present, the motor is restarted in a direction opposite to the last movement at an even more reduced speed, until a marker 88 is positioned in front of the light beam.

The amplifier 99 receives a command signal from the controller 76 and amplifies it for supplying the motor 74. The amplifier 99 is an H-bridge type amplifiers, allowing to change the rotation direction of the motor 74.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

The embodiments of the invention in which an exclusive property or privilege is claimed are defined as follows:

1. A stereoscopic film cartridge for a stereoscopic viewer having binocular eyepieces and a film driving device, comprising:
   an elongated film comprising a plurality of developed stereoscopic images, said elongated film being subsequently thermoformed so that said elongated film tends to roll onto itself and generally form a cylinder; and
   a housing for housing the film, the housing being provided with a first opening arranged to permit engagement of the film driving device with the film when the cartridge is mounted onto the stereoscopic viewer, the housing including:
      two opposite compartments having inlets for receiving ends of the film, each of the compartments having an inner surface provided with upper and lower parallel projecting bands onto which, in operation, lateral edge surfaces of the film slide; and
      a guiding channel extending between the inlets of the compartments, for guiding the film between the inlets, the channel having:
         a front panel provided with right and left adjacent viewing windows arranged to get in alignment with the binocular eyepieces when the cartridge is mounted onto the stereoscopic viewer, the front panel having an inner surface provided with a first pair of upper and lower parallel projecting bands; and
         a rear panel comprising translucent means for permitting light to enter into the channel and illuminate the film at each one of the viewing windows, the rear panel having an inner surface provided with a second pair of upper and lower parallel projecting bands facing respectively the first pair of bands.

2. A stereoscopic film cartridge according to claim 1, wherein the rear panel is a longitudinally curved panel made of a translucent material providing the translucent means.

3. A stereoscopic film cartridge according to claim 1, wherein;
   the two opposite compartments and the front panel are formed by a first integral moulded body made of opaque plastic material; and the rear panel is formed by a second integral moulded body made of translucent plastic material.

4. A stereoscopic film cartridge according to claim 1, wherein:
the first pair of bands comprises a first substantially straight section; and
the second pairs of bands is provided with inwardly projecting parallel edges forming a second substantially straight section opposite to the first straight section for guiding the film along a straight path in front of the viewing windows.

5. A stereoscopic film cartridge according to claim 1, wherein;
the film is a 35 mm film supporting pairs of right and left rectangular stereoscopic images, opaque sections separating the images, the film is provided with an upper row of perforations extending along the film, the perforations being adapted to cooperate with the film driving device; and
the first opening is located in a central superior portion of the front panel so that the first opening faces the row of perforations.

6. A stereoscopic film cartridge according to claim 1, wherein each of the compartments has a curved inner surface.

7. A stereoscopic film cartridge according to claim 1, wherein said elongated film being thermoformed at a temperature of about 200° F. for about 20 minutes.

8. A stereoscopic film cartridge according to claim 1, wherein said elongated film is thermoformed around an axis.

9. A stereoscopic film cartridge according to claim 8, wherein said elongated film is rolled around an axis and thermoformed, unwounded and rolled around the axis in a reverse direction and thermoformed.

10. A stereoscopic film cartridge for a stereoscopic viewer having binocular eyepieces and a film driving device, comprising:
a thermally formed elongated film tending to roll around itself; and
a housing for housing the film, the housing being provided with a first opening arranged to permit engagement of the film driving device with the film when the cartridge is mounted onto the stereoscopic viewer, the housing including:
two opposite compartments having inlets for receiving ends of the film, each of the compartments having an inner surface provided with upper and lower parallel projecting bands onto which, in operation, lateral edge surfaces of the film slide; and
a guiding channel extending between the inlets of the compartments, for guiding the film between the inlets, the channel having:
a front panel provided with right and left adjacent viewing windows arranged to get in alignment with the binocular eyepieces when the cartridge is mounted onto the stereoscopic viewer, the front panel having an inner surface provided with a first pair of upper and lower parallel projecting bands;
said first pair of bands comprises a first substantially straight section;
said second pairs of bands is provided with inwardly projecting parallel edges forming a second substantially straight section opposite to the first straight section for guiding the film along a straight path in front of the viewing windows;
a rear panel comprising translucent means for permitting light to enter into the channel and illuminate the film at each one of the viewing windows, the rear panel having an inner surface provided with a second pair of upper and lower parallel projecting bands facing respectively the first pair of bands; and
a rolling pin made of stainless steel and located in the guiding channel, transversely to movement direction of the film, for applying a uniform pressure to the film of said film as said film is passing by; and wherein two of the parallel edges of the upper and lower bands of the second pairs are provided with opposite notches for receiving ends of the rolling pin to maintain said pin in an operative position in the guiding channel.

11. A stereoscopic film cartridge for a stereoscopic viewer having binocular eyepieces and a film driving device, comprising:
a thermally formed elongated film tending to roll around itself; and
a housing for housing the film, the housing being provided with a first opening arranged to permit engagement of the film driving device with the film when the cartridge is mounted onto the stereoscopic viewer, the housing including:
two opposite compartments having inlets for receiving ends of the film, each of the compartments having an inner surface provided with upper and lower parallel projecting bands onto which, in operation, lateral edge surfaces of the film slide; and
a guiding channel extending between the inlets of the compartments, for guiding the film between the inlets, the channel having:
a front panel provided with right and left adjacent viewing windows arranged to get in alignment with the binocular eyepieces when the cartridge is mounted onto the stereoscopic viewer, the front panel having an inner surface provided with a first pair of upper and lower parallel projecting bands;
a rear panel comprising translucent means for permitting light to enter into the channel and illuminate the film at each one of the viewing windows, the rear panel having an inner surface provided with a second pair of upper and lower parallel projecting bands facing respectively the first pair of bands;
said film is a 35 mm supporting pairs of right and left rectangular stereoscopic images, opaque sections separating the images, the film is provided with an upper row of perforations extending along the film, the perforations being adapted to cooperate with the film driving device;
said first opening is located in a central superior portion of the front panel so that the first opening faces the row of perforations;
said left viewing window has a left side provided, at a given level, with a notch; and
said opaque sections adjacent to each left image of the pairs of images are provided with translucent reference numbers located at said level for allowing an identification of the pairs of images actually viewed by the viewer.

12. A stereoscopic film cartridge for a stereoscopic viewer having binocular eyepieces and a film driving device, comprising:
a thermally formed elongated film tending to roll around itself; and
a film housing for housing the film, the film housing being provided with a first opening arranged to permit engagement of the film driving device with the film when the cartridge is mounted onto the stereoscopic viewer, the film housing including:

two opposite compartments having inlets for receiving ends of the film, each of the compartments having an inner surface provided with upper and lower parallel projecting bands onto which, in operation, lateral edge surfaces of the film slide;

a guiding channel extending between the inlets of the compartments, for guiding the film between the inlets, the channel having:

a front panel provided with right and left adjacent viewing windows arranged to get in alignment with the binocular eyepieces when the cartridge is mounted onto the stereoscopic viewer, the front panel having an inner surface provided with a first pair of upper and lower parallel projecting bands;

a rear panel comprising translucent means for permitting light to enter into the channel and illuminate the film at each one of the viewing windows, the rear panel having an inner surface provided with a second pair of upper and lower parallel projecting bands facing respectively the first pair of bands;

a viewer comprising a viewer housing forming two black chambers, each of the black chambers being provided with front and rear apertures, the rear apertures of the black chambers facing respectively the viewing windows when the cartridge is mounted into the viewer;

binocular eyepieces mounted respectively in the pair of front apertures by means of support elements;

a film driving device having:

a driving member which engages with the film through the first opening when the cartridge is mounted into the viewer;

a motor means for driving the driving member;

a controller for controlling the motor means;

control buttons for actuating the motor means via the controller;

optical indicating means for indicating to the controller when one of the pairs of images is aligned in front of the binocular eyepieces; and at least one battery for electrically supplying the film driving device.

13. A stereoscopic film cartridge in combination with a viewer according to claim 12, wherein the viewer housing encloses substantially the film driving means, and is provided with:

two upper openings allowing a user access to the control buttons;

a rear central superior opening through which the driving member is located; and a rear central lower opening through which the optical indicating means operates.

14. A stereoscopic film cartridge in combinations with a viewer according to claim 13, wherein:

the film is provided along its length with a translucent band adjacent to its lower edge, the translucent band is regularly provided with opaque marks each corresponding to one of the pair of images;

the front panel is provided with a second opening adjacent to its lower edge and facing the rear central lower opening of the housing of the viewer when the cartridge is mounted into the viewer;

the real panel has its inner surface provided with a reflector facing the second opening; and the optical indicating means comprises a light emitting diode connected to the controller, and a phototransistor connected to the controller via an amplifier, the light emitting diode and the phototransistor are located nearby the rear central lower opening of the housing of the viewer, whereby, in operation, a light beam is emitted from the light emitting diode through the translucent band of the film and reflected back by the reflector toward the phototransistor as the film is moving until the light beam is blocked by one of the opaque marks, which is indicative to the controller that one of the pair of images is correctly positioned in front of the viewing windows.

15. A stereoscopic film cartridge in combination with a viewer according to claim 14, wherein the housing of the cartridge is provided with teeth cooperating with the rear central lower opening of the housing for correctly positioning the cartridge with respect to the viewer.

* * * * *